United States Patent [19]

Suzuki et al.

[11] 4,136,564
[45] Jan. 30, 1979

[54] MASS FLOW RATE DETECTOR OF ELECTROSTATIC TYPE

[75] Inventors: Suzuo Suzuki, Yokosuka; Yoshihisa Kawamura, Fujisawa; Mitsuhiko Ezoe, Yokosuka, all of Japan

[73] Assignee: Nissan Motor Company, Limited, Yokohama, Japan

[21] Appl. No.: 878,900

[22] Filed: Feb. 17, 1978

[30] Foreign Application Priority Data

May 2, 1977 [JP] Japan .................................. 52/51360

[51] Int. Cl.² .............................................. G01F 1/56
[52] U.S. Cl. ................................................ 73/194 F
[58] Field of Search ......................... 73/194 F; 324/33

[56] References Cited

U.S. PATENT DOCUMENTS

| | | | |
|---|---|---|---|
| 3,831,445 | 8/1974 | Durbin | 73/194 |
| 3,996,795 | 12/1976 | Servassier | 73/194 |
| 4,074,572 | 2/1978 | Bullis et al. | 73/194 |

*Primary Examiner*—Herbert Goldstein
*Attorney, Agent, or Firm*—Richard L. Schwaab

[57] ABSTRACT

A flow rate detector of the type comprising a corona discharge circuit to cause partial ionization of a fluid at a section of a fluid passage and a probe positioned downstream for detecting the amount of ions carried by the fluid as an indication of the fluid flow velocity. To achieve direct detection of mass flow rate even when the fluid exhibits fluctuation in its density, the detector includes a control circuit which serves the function of maintaining the intensity of a discharge current flowing through the corona discharge circuit constant.

7 Claims, 7 Drawing Figures

MASS FLOW RATE DETECTOR OF ELECTROSTATIC TYPE

BACKGROUND OF THE INVENTION

This invention relates to a device for measuring mass flow rate of a fluid through partial ionization of the fluid.

Concerning internal combustion engines, particularly of automotive use, there is much need of detecting mass flow rate of a fluid, which may be air, fuel, combustible mixture or exhaust gas, in order to perform various sorts of control with the aims of, for example, lessening pollutants in the exhaust gas and attaining improved fuel economy.

Various methods are known for measurement of mass flow rate of a fluid, but there are great restrictions on the application of these methods to automotive engine systems. As a consequence, only a few types of methods have been the object of practical consideration for use in automobiles.

(1) Measurement of pressure difference produced by constriction of fluid flow

This method, based on the Bernoulli's law, is principally the measurement of pressure difference between two points respectively upstream and downstream of a constricted section such as a nozzle, orifice or venturi provided in a fluid passage. Since the Bernoulli's law applies only to a steady flow of a nonviscous fluid, the employment of this method in an internal combustion engine system in which a fluid flow subject to measurement comprises inherently a pulsative flow component requires that, as an inconvenience, a substantially steady flow be established by certain means such as suitable dampers. Also as a matter of practical inconvenience, it is necessary because of the fact that the pressure difference to be measured in the engine system is of a very small magnitude to use a highly sensitive pressure gauge such as a mechanical-electrical transducer, which is costly and in its accuracy tends to be influenced by the fluid temperature, external vibrations, etc. As an additional inconvenience, it is a requisite to this method that the specific weight of the fluid passing through the constricted section is known since, in a formula as a basis of this method, the mass flow rate is given as proportional to the square root of the product of the specific weight and the measured pressure difference. If the specific weight exhibits fluctuation, there is the need of making certain correction of the result of the pressure measurement.

(2) Measurement of velocity distribution

In this method, mass flow rate is found by detecting velocity distribution of a fluid flow within a section thereof and integrating the distribution with respect to the area of the section. The velocity distribution is detected by means of, for example, Pitot tubes or hot-wire anemometers, but it is not easy to achieve the detection minutely and nevertheless simply. Hot-wire anemometers are convenient to practical use, but there is a problem that errors are involved unless the fluid temperature is constant. Besides, this method too is required that the specific weight of the fluid be found by a separate means.

(3) Regulation of sectional area of fluid flow to maintain a constant pressure difference This method, practiced as an air flow rate detector in electronic fuel injection systems for automotive engines, employs a device such as an air valve which constitutes part of a fluid passage and is capable of maintaining a pressure difference produced between two points respectively upstream and downstream of the device by continuously varying the effective cross-sectional area thereof. Flow rate is detected from, for example, an angle of rotation of a control element of the device needed to cancel a change in the pressure difference attributable to a change in the flow rate. To achieve accurate measurement of mass flow rate by this method, there is the need of accurately grasping the density of the fluid with corrections for pressure and temperature.

Recently it has been proposed as a new method of detecting flow rate to make corona discharge in a fluid flow to cause partial ionization of the fluid and detecting the movement of a portion of the formed ions as an accurate indication of the velocity of the fluid flow or volume rate of the flow. This method is advantageous in that a compact flow meter including principally no mechanically moving element can be produced and that the flow rate is indicated by an electrical signal. An instrument according to this method serves as a mass flow rate detector if a fluid subject to measurement has a constant density, but when the fluid exhibits fluctuation in its density this instrument can no longer accomplish a highly accurate detection of the mass flow rate since a change in the fluid density causes a change in the number of ions formed by corona discharge (under a fixed discharge condition).

With regard to internal combustion engine systems, particularly on automobiles, neither air nor fuel flowing therein is strictly constant in density, but until now it has been a usual practice in detecting flow rate of either air or fuel to assume that the density of the fluid is constant because of an extreme complication which arises if a change in the density should be taken into account. However, there is the need of accomplishing a very precise control of air/fuel ratio in the engine systems to meet severe requirements for cleaner exhaust gas and better fuel economy, meaning the need of highly accurate measurement of the quantities of air and fuel being admitted into the engine. Particularly an accurate measurement of the mass flow rate of air in the engine induction passage is an important requisite for success in realizing a fully satisfactory air/fuel ratio control. Accordingly there is an earnest demand for a mass flow rate detector which is suitable in construction for use in automotive engine systems and fulfils its function even when applied to a fluid of a fluctuating density.

SUMMARY OF THE INVENTION

It is an object of the present invention to provide a flow rate detector, as an improvement on the above described instrument of the corona discharge type, which detector can indicate a true mass flow rate even though a fluid subject to measurement exhibits fluctuation in its density and has a simple construction suited for practical application to automotive engine system.

A flow rate detector according to the invention comprises a set of two electrodes spaced and disposed in a section of a fluid passage, a power supply for applying a high voltage to the electrodes to make corona discharge across these electrodes thereby to partially ionize the fluid, an ion detection electrode disposed in the fluid passage at a distance downstream from the corona discharge electrodes, and means for producing an electrical output representing the amount of ions collected by the ion detection electrode. In these respects the flow rate detector is of a known construction. As the improvement according to the invention, the flow rate detector further comprises a control circuit which has the function of maintaining the intensity of a discharge current flowing between the corona discharge electrodes constant by regulating the output voltage of the power supply.

Since corona discharge by this device is made with a constant discharge current, a change in the density of the fluid leads to no change in the total number of ions formed by the corona discharge. However, the amount of ions carried by the fluid flow to the ion detection electrode depends not only on the velocity of the fluid flow but also on the density of the fluid. As a consequence, the voltage produced by the ion detection electrode always represents a true mass flow rate.

Preferably, the control circuit is constructed so as to detect an actual intensity of the discharge current and, if the detected current intensity exhibits any deviation from a preset value corresponding to a standard density of the fluid, cancel the deviation through regulation of the output voltage of the power supply.

DETAILED DESCRIPTION OF THE INVENTION

For better understanding of the invention, an explanation of a known flow rate detector of an electrostatic type will be made with reference to FIG. 1 in advance of the description of preferred embodiments of the invention.

Figure 1:
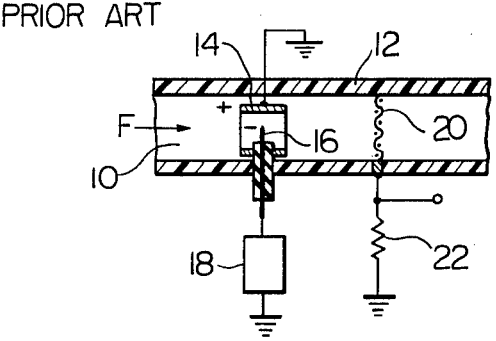
FIG. 1 shows a fundamental construction of a known flow rate detector of an electrostatic type.

In FIG. 1, the interior of a pipe 12 gives a fluid passage 10 through which a fluid, either gas or liquid, flows always in a direction indicated by the arrow F. Two electrode members 14 and 16 are fixedly disposed in the fluid passage 10 so as to be opposite to and spaced from each other in a direction generally normal to the direction F of the fluid flow and are connected to a DC high voltage generator 18. Either one or both of the two electrode members 14 and 16 may be placed directly on the inside of the pipe 12. When the pipe 12 is of an electrically conducting material, the electrode members 14, 16 and/or leads for them are electrically isolated from the pipe 12 by means of suitable insulators. The arrangement of the electrodes 14, 16 and the ability of the high voltage generator 18 are such that corona discharge occurs across the electrodes 14 and 16 when a high voltage (usually of several kilovolts) is applied thereto from the generator 18. At a certain distance downstream from the electrodes 14, 16, an ion detection electrode 20 is disposed in the fluid passage 10 and grounded through a load resistor 22. The illustration of this electrode 20 as to take the form of net is only by way of example. The fluid passage 10 has a uniform cross-sectional area over the distance between the corona discharge electrodes 14, 16 and the ion detection electrode 20. The tubular shape of the positive electrode 14 and the needle-like shape of the negative electrode 16 (inserted radially into the tubular electrode 14) in the drawings are preferable but should be taken as exemplary.

The flow rate detector of FIG. 1, i.e. the combination of a corona discharge circuit and an ion detection electrode, operates on the following principle.

Corona discharge is made across the electrodes 14 and 16 while a fluid flows through the passage 10 to cause partial ionization of the fluid through the following phenomena. Upon application of a high voltage to the positive and negative electrodes 14 and 16, an electric field is produced between the electrodes 14, 16 so that electrons emitted by the negative electrode 16 are biased and accelerated towards the positive electrode 14. Collision of an electron having a sufficiently large energy with a molecule of the fluid causes ionization of the molecule, producing a new electron and a positively charged ion. The thus produced electron too is accelerated in the electric field and makes a collision with another fluid molecule to cause ionization. As a consequence, electrons directed to the positive electrode 14 exhibit an increase in number by geometrical progression with a corresponding increase in the number of positively charged ions which migrate towards the negative electrode 16.

Meanwhile a portion of the electrons lose energy through successive collision with a plurality of molecules, and the collision of an electron in such a state with a neutral fluid molecule results in the formation of a negatively charged ion. This ion is less influenced by the electric field because of its larger mass than either an electron or a positively charged ion and hence tends to be carried away downstream by the flowing fluid without arriving at the positive electrode 14. The arrival of the ions carried by the fluid at the ion detection electrode 20 is recognized as a voltage developed across the load resistor 22. Insofar as the fluid has a constant density and the voltage for the corona discharge is constant, a constant number of ions are formed by the corona discharge and accordingly the voltage across the resistor 22, or the quantity of ions carried to the ion detection electrode 20, is proportional to the velocity of the fluid flow. A change in the velocity of the fluid flow does not accompany a change in the quantity of negatively charged ions in the electric field between the electrodes 14 and 16 but causes, for example if the change in the flow velocity is an increase, an increased amount of the negatively charged ions to flow towards the ion detection electrode 20. Thus, the instrument of FIG. 1 can detect the velocity of the fluid flow and hence serves as either a volume flow rate detector or a mass flow rate detector 30 so long as the density of the fluid is constant.

However, the situation is different when there occurs a change or fluctuation in the density of the fluid. Lowering in the density means a decrease in neutral fluid molecules in a volume of the fluid, so that the electrons liberated by the corona discharge exhibit a longer mean free path and are accelerated more greatly in the electric field. Accordingly each electron has an increased chance of colliding with fluid molecules, resulting in that an increased number of negatively charged ions are formed in the electric field. On the contrary, a rise in the density of the fluid causes a decrease in the number of the negatively charged ions. When the fluid exhibits a fluctuation in its density, therefore, the voltage attributable to the collection of ions by the ion detection electrode 20 exhibits fluctuation even though the velocity of the fluid flow remains constant: the voltage has no longer a linear relationship with the velocity of the fluid flow. Thus, the instrument of FIG. 1 does not serve as a mass flow rate detector unless the density of the fluid is constant.

Figure 2:
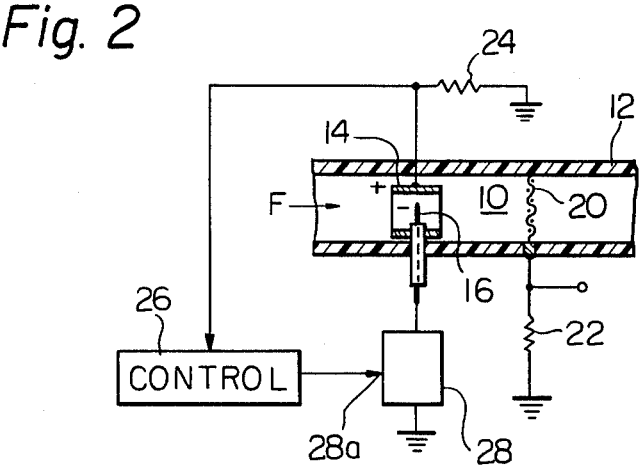
FIG. 2 shows the fundamental construction of a mass flow rate detector as an embodiment of the invention.

Now an embodiment of the invention will be described with reference to FIG. 2, wherein the corona discharge electrodes 14 and 16, the ion detection electrode 20 and the load resistor 22 are arranged in the same manner as in the instrument of FIG. 1 in association with the fluid passage 10. However, one (14) of the corona discharge electrodes 14, 16 is grounded via a resistor 24 of a sufficiently high resistance and is connected also to the input gate of a control circuit 26. In this instrument, a DC high voltage generator 28 for applying a high voltage to the electrodes 14, 16 is of a type capable of varying its output voltage in response to an electrical control signal. The output of the control circuit 26 serves as this control signal and is supplied to an input gate 28a of the generator 28.

When corona discharge is made across the electrodes 14 and 16, a current flows between these two electrodes 14, 16 and the intensity of this current is represented by a voltage produced across the resistor 24. The control circuit 26 has the function of modifying its output, i.e. the control signal to the high voltage generator 28, to control the output voltage of the generator 28 such that the current flowing between the corona discharge electrodes 14 and 16 has constantly a predetermined intensity.

While the density of the fluid remains constant, there occurs no fluctuation in the intensity of the aforementioned current and accordingly the output voltage of the generator 28 is maintained constant. In this situation, the instrument of FIG. 2 operates in the same way as the known instrument of FIG. 1 does. A constant number of negatively charged ions are formed by corona discharge across the electrodes 14, 16, so that the number of ions collected by the ion detection electrode 20 has a linear dependence on the velocity of the fluid flow. In other words, a voltage v detected across the load resistor 22 is proportional to the volume flow rate (will be represented by M) of the fluid. The detection of M implies the detection of the mass flow rate of the fluid so long as the fluid has a constant density.

When, for example, the fluid exhibits lowering in its density while the velocity in the fluid flow remains constant, there occurs increase in the discharge current flowing between the electrodes 14 and 16, i.e. the input voltage to the control circuit 26. Then the control circuit 26 makes regulation or modulation of its output (the control signal to the high voltage generator 28) so as to lower the voltage applied to the corona discharge electrodes 14, 16 until the intensity of the current flowing between the electrodes 14, 16 returns to a predetermined constant. A constant intensity of the current flowing between the corona discharge electrodes 14 and 16 regardless of the density of the fluid means that a constant number of electrons travel from the negative electrode 16 to the positive electrode 14 and accordingly that a constant number of negatively charged ions are formed in the electric field produced by the corona discharge. In the case of, for example, lowering of the fluid density under a constant velocity of the fluid flow and a constant intensity of the current, there occurs a decrease, which is proportional to the lowering of the fluid density, in the quantity of negatively charged ions carried towards the ion detection electrode 20 since an increased amount of the negatively charged ions are attracted by the positive electrode 14 in dependence on the magnitude of the lowering of the fluid density. The voltage v across the load resistor 22 in the instrument of FIG. 2, therefore, is proportional to the density (will be represented by d) of the fluid. Since the voltage v is proportional also to the volume flow rate M, the voltage v can be given as a function of the product (d × M) which implies the mass flow rate of the fluid through passage 10. Thus, the instrument of FIG. 2 serves as a mass flow rate detector which is not influenced by changes in the density of the fluid flowing through the passage 10.

Figure 3:
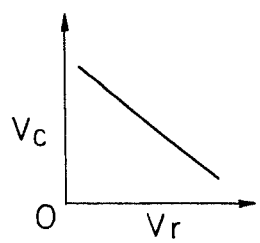
FIG. 3 is a graph for the explanation of the function of a control circuit in the instrument of FIG. 2.

It suffices that the control circuit 26 is essentially a function generator whose output (the control signal to the high voltage generator 28) varies such that the output voltage ($V_c$) of the generator 28 varies as a function of the voltage ($V_r$) across the resistor 24 in a manner as shown in FIG. 3.

Figure 4:
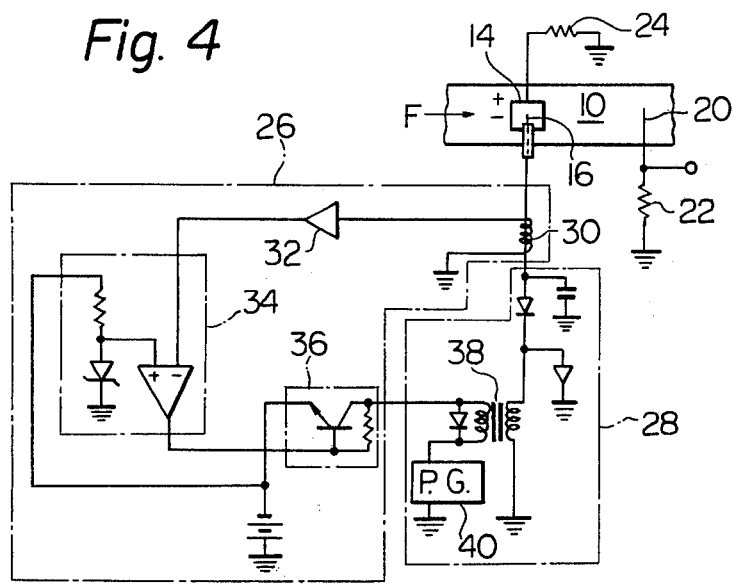
FIG. 4 is a circuit diagram showing an embodiment of the same control circuit.

For example, the control circuit 26 is constructed as shown in FIG. 4. A coil 30, as a part of the control circuit 26, is associated with the circuit connecting the high voltage generator 28 to the negative electrode 16 for the detection of a current flowing between the corona discharge electrodes 14, 16. A current signal provided by this coil 30 is put into a comparator 34 via an amplifier 32. The output of the comparator 34 indicates the magnitude of a deviation, if any, of the aforementioned current signal from a reference signal and is supplied to a current regulation circuit 36 the output of which serves as the output of the control circuit 26. The high voltage generator 28 has a boosting transformer 38 and a pulse generator 40 connected to the primary coil of the transformer 38. The output of the current regulation circuit 36 is supplied as a control signal to the primary circuit of the transformer 38 to achieve the hereinbefore described control of the output voltage of the generator 28 by regulating the intensity of the primary current in the transformer 38.

Figure 5:
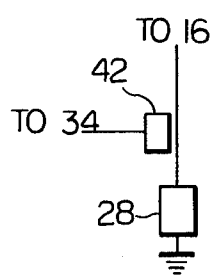
FIGS. 5 and 6 show respectively two variations of a portion of the control circuit of FIG. 4.
Figure 6:
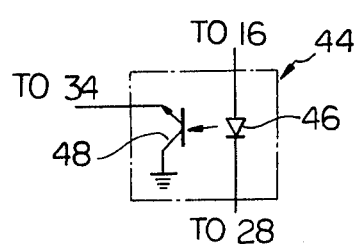

It is possible to use a Hall effect element 42, as shown in FIG. 5, in place of the current detecting coil 30 in FIG. 4. Still alternatively, use may be made of a photocoupler 44, shown in FIG. 6, made up of a light emitting diode 46 included in the corona discharge circuit and a photosensitive transistor 48.

Figure 7:
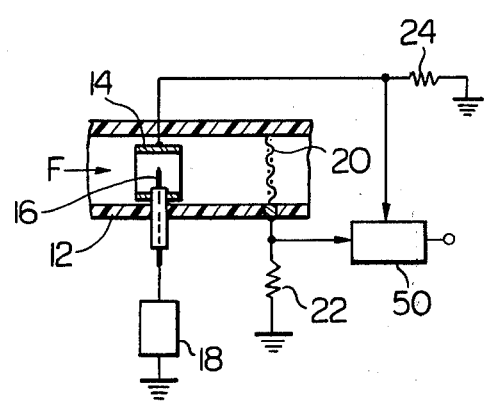
FIG. 7 shows the fundamental construction of another mass flow rate detector as another embodiment of the invention.

FIG. 7 shows another embodiment of a mass flow rate detector according to the invention. The corona discharge electrodes 14, 16, the resistor 24 for the discharge current detection, the ion detection electrode 20 and the load resistor 22 are arranged in the same manner as in the instrument of FIG. 2. In this case, however, the high voltage generator 18 of the constant voltage type is used in the corona discharge circuit, and the instrument includes a correction circuit 50 to which are supplied both the voltage v across the resistor 24 and the voltage across the load resistor 22. While the fluid has a constant density, the sum of the current represented by the voltage v and the current flowing through the load resistor 22 is constant. The correction circuit 50 has the function of detecting any deviation of the sum of the two input voltages and accomplishing an amplitude modulation of the output of the load resistor 22 so as to compensate for the detected deviation.

What is claimed is:

1. A device for measuring mass flow rate of a fluid in a fluid passage, comprising:
   a set of corona discharge electrodes spaced and disposed in a section of said fluid passage;
   a power supply for applying a high voltage to said electrodes to make corona discharge across said electrodes thereby to partially ionize said fluid;
   an ion detection electrode disposed in said fluid passage at a distance downstream from said corona discharge electrodes;
   an output producing means for producing an electrical output representing the amount of ions collected by said ion detection electrode; and
   a control means for regulating the output voltage of said power supply so as to maintain the intensity of a discharge current flowing between said corona discharge electrodes constant, whereby the formation of ions by said corona discharge is not influenced by fluctuation in the density of said fluid while said amount of ions becomes a function of the product of said density and the volume flow rate of said fluid.

2. A device according to claim 1, wherein said control means comprise means for detecting an actual intensity of said discharge current and producing a feedback signal representing the detected current intensity and means for regulating the output voltage of said power supply based on said feedback signal.

3. A device according to claim 2, wherein said control means further comprise means for comparing said feedback signal with a reference signal representing a current intensity corresponding to a standard density of said fluid, the output voltage of said power supply being regulated so as to cancel any difference between said feedback signal and said reference signal.

4. A device according to claim 2, wherein the current intensity detection means comprise a coil associated with a circuit connecting said power supply to said corona discharge electrodes.

5. A device according to claim 2, wherein the current intensity detection means comprise a Hall effect element associated with a circuit connecting said power supply to said corona discharge electrodes.

6. A device according to claim 2, wherein the current intensity detection means comprise a photocoupler having a combination of a light-emitting diode connected in series with said power supply and said corona discharge electrodes and a photosensitive transistor.

7. A device according to claim 1, wherein said output producing means comprise a resistor through which said ion detection electrode is grounded.

* * * * *